US012771164B2

(12) United States Patent
Kim et al.

(10) Patent No.: US 12,771,164 B2
(45) Date of Patent: Oct. 20, 2026

(54) HYBRID UNINTERRUPTIBLE POWER SUPPLY

(71) Applicant: Samsung Electronics Co., Ltd., Suwon-si (KR)

(72) Inventors: Dohyun Kim, Suwon-si (KR); Kyutae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/010,662

(22) Filed: Jan. 6, 2025

(65) Prior Publication Data

US 2025/0373068 A1 Dec. 4, 2025

(30) Foreign Application Priority Data

May 30, 2024 (KR) ........................ 10-2024-0071005

(51) Int. Cl.

| | |
|---|---|
| ***H02J 9/06*** | (2006.01) |
| ***H02J 3/0012*** | (2026.01) |
| ***H02J 3/0073*** | (2026.01) |
| ***H02J 3/01*** | (2026.01) |

(Continued)

(52) U.S. Cl.
CPC ............ *H02J 9/062* (2013.01); *H02J 3/0012* (2020.01); *H02J 3/0073* (2020.01); *H02J 3/01* (2013.01); *H02J 3/18* (2013.01); *H02J 3/32* (2013.01); *H02J 9/068* (2020.01)

(58) Field of Classification Search
CPC .. G06F 1/263; G06F 1/30; G06F 1/305; H02J 3/0012; H02J 3/0073; H02J 3/01; H02J 3/18; H02J 3/32; H02J 9/06; H02J 9/062; H02J 9/068
See application file for complete search history.

(56) References Cited

U.S. PATENT DOCUMENTS

| | | | |
|---|---|---|---|
| 5,148,043 | A | 9/1992 | Hirata et al. |
| 8,853,887 | B2 | 10/2014 | Silberbauer et al. |
| 10,084,341 | B2 | 9/2018 | Toyoda |

(Continued)

FOREIGN PATENT DOCUMENTS

| | | | |
|---|---|---|---|
| JP | 6938452 | B2 | 9/2021 |
| KR | 910003892 | A | 2/1991 |

(Continued)

*Primary Examiner* — Levi Gannon
(74) *Attorney, Agent, or Firm* — Wolf, Greenfield & Sacks, P.C.

(57) ABSTRACT

A hybrid uninterruptible power supply includes a power conversion unit including a converter electrically connected to a first external alternating current (AC) power source, an inverter electrically connected to an output of the converter and to a load, and a power storage unit electrically connected between the converter and the inverter, a current thrupass unit electrically connected to the first external AC power source and electrically connected to the load and including a first thyristor, a current bypass unit including a second thyristor and a switch electrically connected in parallel to the second thyristor, the second thyristor being electrically connected to a second external AC power source and electrically connected to the load, and a controller configured to control the power conversion unit, the current thrupass unit, and the current bypass unit.

20 Claims, 7 Drawing Sheets

(51) Int. Cl.
*H02J 3/18* (2026.01)
*H02J 3/32* (2026.01)

(56) References Cited

U.S. PATENT DOCUMENTS

| | | | | |
|---|---|---|---|---|
| 10,305,320 | B2 | 5/2019 | Tricarico et al. | |
| 10,554,076 | B2 | 2/2020 | Nakano | |
| 10,756,567 | B2 | 8/2020 | Masunaga et al. | |
| 11,133,678 | B2 | 9/2021 | Nishimura et al. | |
| 11,159,160 | B2 | 10/2021 | Shigeta et al. | |
| 11,616,388 | B1 * | 3/2023 | Chen | H02J 9/062 307/64 |
| 2014/0097690 | A1 * | 4/2014 | Costa | H02J 9/062 307/64 |
| 2019/0190312 | A1 * | 6/2019 | Kin | H02J 9/062 |
| 2020/0185960 | A1 * | 6/2020 | Toyoda | H02M 7/487 |
| 2021/0249898 | A1 * | 8/2021 | Schecter | H02J 9/068 |
| 2022/0190637 | A1 | 6/2022 | Shigeta | |
| 2022/0224149 | A1 * | 7/2022 | Colombi | H02J 9/062 |
| 2023/0122255 | A1 * | 4/2023 | Shu | H02J 3/381 307/43 |
| 2024/0120769 | A1 * | 4/2024 | Kano | H02J 9/06 |
| 2024/0339862 | A1 * | 10/2024 | Momochi | H02J 9/06 |

FOREIGN PATENT DOCUMENTS

| | | | |
|---|---|---|---|
| KR | 101989758 | B1 | 6/2019 |
| KR | 102077528 | B1 | 2/2020 |
| KR | 102441119 | B1 | 9/2022 |

* cited by examiner

HYBRID UNINTERRUPTIBLE POWER SUPPLY

CROSS-REFERENCE TO RELATED APPLICATION

This application is based on and claims priority under 35 U.S.C. § 119 to Korean Patent Application No. 10-2024-0071005, filed on May 30, 2024, in the Korean Intellectual Property Office, the disclosure of which is incorporated by reference herein in its entirety.

BACKGROUND

The inventive concept relates to a hybrid uninterruptible power supply.

An uninterruptible power supply is a device that assists in power supply through energy stored in a battery when power outage occurs. Additionally, an uninterruptible power supply supplies power supplied from the outside or from an external source through a converter and inverter. Therefore, uninterruptible power supplies are widely used in power systems across industry to provide a stable supply of power to loads. However, uninterruptible power supplies supply power through continuous power conversion by a converter and inverter, and accordingly, some power loss occurs.

A voltage drop protector is a device that protects a facility from instantaneous voltage drops occurring in supplied power and is also widely used in power systems across industry. However, when a voltage drop protection device operates due to an abnormality in a power system, a temporary stoppage of power supply may occur.

SUMMARY

The inventive concept provides a hybrid uninterruptible power supply that may assist in power supply through energy stored in a battery when power outage occurs, maintain a stable supply of power to loads, and also efficiently supply power.

Objects to be achieved by the inventive concept are not limited to the objects described above, and other objects not described will be clearly understood by those of skill in the art from descriptions below.

According to an aspect some embodiments of the inventive concept, a hybrid uninterruptible power supply includes a power conversion unit including a converter electrically connected to a first external alternating current (AC) power source, an inverter electrically connected to an output of the converter and to a load, and a power storage unit electrically connected between the converter and the inverter, a current thrupass unit electrically connected to the first external AC power source and electrically connected to the load and including a first thyristor, a current bypass unit including a second thyristor and a switch electrically connected in parallel to the second thyristor, the second thyristor being electrically connected to a second external AC power source and electrically connected to the load, and a controller configured to control the power conversion unit, the current thrupass unit, and the current bypass unit.

According to some embodiments of the inventive concept, a hybrid uninterruptible power supply includes a power conversion unit including a converter electrically connected to a first external AC power source, an inverter electrically connected to an output of the converter and electrically connected to a load, and a power storage unit electrically connected between the converter and the inverter, a high-efficiency operation unit electrically connected to the first external AC power source and electrically connected to the load and including a first thyristor, a current bypass unit including a second thyristor electrically connected to a second external AC power source and electrically connected to the load, and a bypass switch electrically connected in parallel to the second thyristor, and a controller configured to control the power conversion unit, the high-efficiency operation unit, and the current bypass unit, wherein the first external AC power source and the second external AC power source are separate power sources, the controller is further configured to, during a normal operation, control power supplied by the first external AC power source to the load through the high-efficiency operation unit, the controller is further configured to selectively charge the power storage unit by the converter during normal operation, the controller is further configured to detect interruption of the first external AC power source, the power storage unit is configured to supply power to the load when the first external AC power source is interrupted, and the controller is configured to activate the second thyristor by transmitting an electrical signal to the second thyristor to supply power to the load from the second external AC power source through the second thyristor.

According to some embodiments of the inventive concept, a hybrid uninterruptible power supply includes a power conversion unit including a converter electrically connected to a first external AC power source, an inverter electrically connected to an output of a converter and to a load, and a power storage unit electrically connected between the converter and the inverter, a high-efficiency operation unit electrically connected to the first external AC power source and electrically connected to the load and including a first thyristor, a current bypass unit including a second thyristor electrically connected to a second external AC power source and electrically connected to the load, and a bypass switch electrically connected in parallel to the second thyristor, and a controller configured to control the power conversion unit, the high-efficiency operation unit, and the current bypass unit, wherein the first external AC power source and the second external AC power source are separate power sources, the controller is further configured to, during a normal operation, control power supplied by the first external AC power source to the load through the high-efficiency operation unit, the controller is further configured to, during the normal operation, selectively charge the power storage unit by the converter, the controller is further configured to detect interruption of the first external AC power source, the controller is further configured to supply power to, during the normal operation, the load from the power storage unit when detecting an abnormality of the first external AC power source, and the abnormality of the first external AC power source includes one of a voltage drop of the first external AC power source or interruption of the first external AC power source, the power storage unit is configured to supply power to the load when the first external AC power source is interrupted, and the controller is configured to activate the second thyristor by transmitting an electrical signal to the second thyristor to supply power to the load from the second external AC power source through the second thyristor, the controller is further configured to, when power is supplied from the second external AC power source to the load through the second thyristor, close the bypass switch of the current bypass unit such that the power supplied by the second external AC power source is supplied to the load through the bypass switch, the inverter operates as an active power filter for the load to compensate for reactive power for the load, the first external AC power source and the second external AC power source are three-phase AC powersupplies, the hybrid uninterruptible power supply includes three current thrupass units and three current bypass units, the three current thrupass units are electrically connected to the three-phase AC power supply to respectively correspond to phases of the three-phase AC power supply, and the three current bypass units are electrically connected to the three-phase AC power supply to respectively correspond to phases of the three-phase AC power supply, and each of the first thyristor and the second thyristor includes a silicon controlled rectifier (SCR).

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
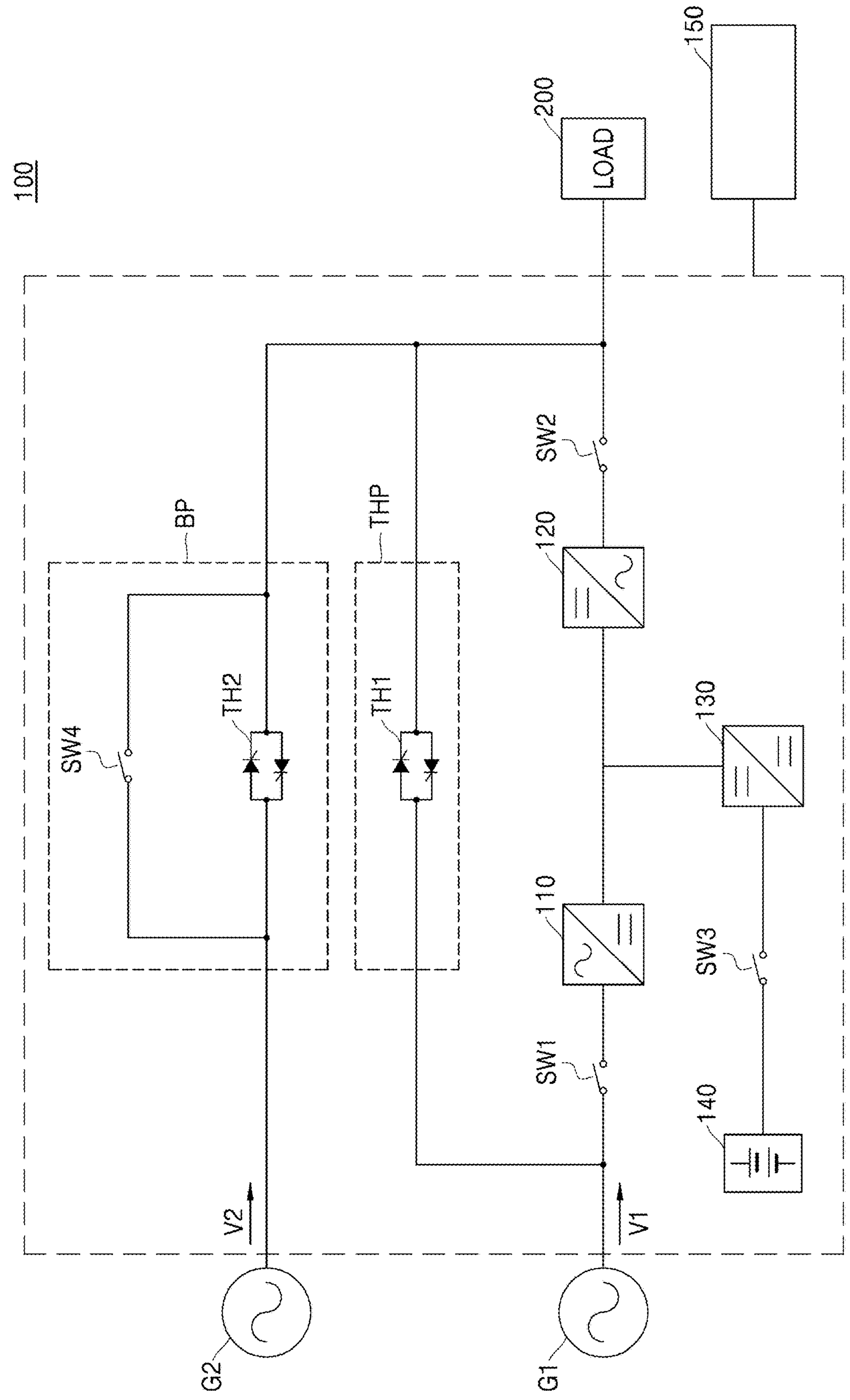
FIG. 1 is a circuit diagram illustrating a hybrid uninterruptible power supply according to some embodiments.

Hereinafter, embodiments of the inventive concept are described in detail with reference to the attached drawings. The same reference numerals are used for the same components in the drawings, and redundant descriptions thereof are omitted.

Embodiments of the inventive concept are provided to more completely describe the technical idea of the inventive concept to those of skill in the art, and following embodiments may be modified into various other forms, and the scope of the inventive concept is not limited to the following embodiments. Rather, the embodiments are provided to make the inventive concept more complete and to convey the technical idea of the inventive concept to those of skill in the art. Also, thicknesses and sizes of respective layers in the drawings are exaggerated for the sake of convenience and clarity of description.

FIG. 1 is a circuit diagram illustrating a hybrid uninterruptible power supply 100 according to some embodiments. FIGS. 2 to 5 are circuit diagrams illustrating operations of the hybrid uninterruptible power supply 100 according to some embodiments.

Referring FIGS. 1 to 5, the hybrid uninterruptible power supply 100 may include a power conversion unit including a converter 110, an inverter 120, a direct current (DC) converter 130, and a battery 140, a current thrupass unit THP including a first thyristor TH1, a current bypass unit BP including a second thyristor TH2 and a fourth switch SW4, and a controller 150. The power conversion unit may further include a first switch SW1, a second switch SW2, and a third switch SW3. During a normal operation which is described below, power is mainly supplied through the current thrupass unit THP, and the current thrupass unit THP may be referred to as a high-efficiency operation unit in the present specification.

The first switch SW1 may be placed before the converter 110, the second switch SW2 may be placed behind the inverter 120 (i.e., between the inverter 120 and the load 200), and the third switch SW3 may be between the battery 140 and the DC converter 130. In addition to the first, second, and third switches SW1, SW2, and SW3, other switches may be added to the hybrid uninterruptible power supply 100 as needed. Also, operation of the first, second, and third switches SW1, SW2, and SW3 may be controlled by the controller 150 by electrically connecting the switches to the controller 150 to be opened and closed according to a signal from the controller 150.

The converter 110 may be referred to as an alternating current (AC)-DC converter. The converter 110 may convert AC power into DC power and convert a bidirectional flow of an AC current into a unidirectional flow of a DC current through a transistor or an insulated gate bipolar transistor (IGBT). Also, a filter and voltage regulator included in the converter 110 may stabilize a pulse DC current.

The inverter 120 may be referred to as a DC-AC converter. The inverter 120 may include a switching circuit and a filter. The inverter 120 may generate an AC current waveform by connecting or disconnecting a DC input at a high speed by using, for example, a switching element (for example, a transistor or IGBT). The AC current generated by using the switching element may generally include unnecessary high-frequency components. The unnecessary high-frequency components of the AC current generated by using the switching element may be removed by a filter including an inductor and a capacitor.

The DC converter 130 may change the input DC voltage into a DC voltage suitable for use. The DC converter 130 may include a switching regulator.

Figure 2:
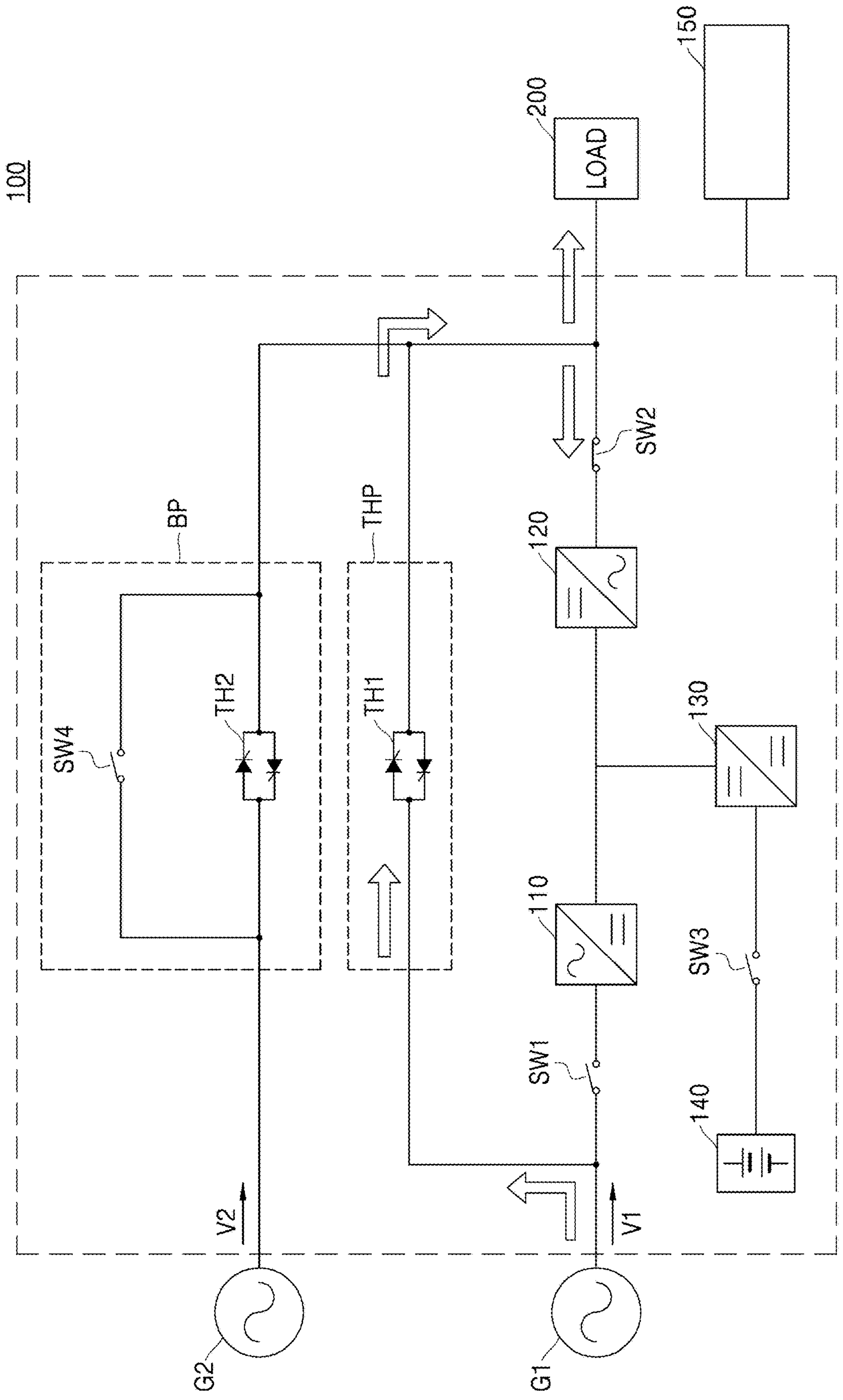
FIG. 2 is a circuit diagram illustrating an operation of a hybrid uninterruptible power supply according to some embodiments.

As illustrated in FIG. 2, the AC power supplied by a first external AC power source G1 may be provided to the converter 110 and the current thrupass unit THP. The current thrupass unit THP may be connected in parallel to the converter 110 and the inverter 120. During a normal operation, the hybrid uninterruptible power supply 100 according to some embodiments supply power to the load 200 through the current thrupass unit THP, rather than through the converter 110 and the inverter 120.

The normal operation refers to an operation state of the hybrid uninterruptible power supply 100 in which there is no abnormality in the first external AC power source G1. For example, the abnormality of the first external AC power source G1 may include a state where supply of first AC power V1 from the first external AC power source G1 to the hybrid uninterruptible power supply 100 is interrupted and a state where a voltage drop or so on of the first AC power V1 occurs.

A general uninterruptible power supply may supply AC power continuously received from an external AC power source to a load through a converter and inverter. Even when the converter and the inverter are highly efficient, losses may occur in the converter and inverter during conversion of electricity. Therefore, the general uninterruptible power supply may supply AC power to a load through a converter and inverter, and accordingly, power loss occurs during the conversion of electricity. For example, the conversion efficiency of a typical uninterruptible power supply including a high-efficiency converter and inverter may be about 97%.

During a normal operation, the hybrid uninterruptible power supply 100 according to the embodiment may supply power to the load 200 through the current thrupass unit THP, rather than through a converter and inverter.

The current thrupass unit THP may be connected in parallel to the converter 110 and the inverter 120 and receive the first AC power V1 supplied by the first external AC power source G1 and supply a voltage to the load 200. The current thrupass unit THP may include the first thyristor TH1. The first thyristor TH1 may be configured by, for example, a silicon controlled rectifier (SCR).

The SCR is a device having a quadruple semiconductor structure of PNPN including a PNP transistor and an NPN transistor. The SCR may operate as a switch in a semiconductor device or an electronic circuit. When an anode of the SCR has a positive voltage with respect to a cathode of the SCR, and when a gate pulse signal is applied to a gate of the SCR, the SCR may be turned on. When the SCR is turned on, the SCR may be maintained turned on as long as a voltage of the anode is not zero volts even when the gate pulse signal is not applied to the gate.

Since the first thyristor TH1 configured by an SCR does not perform a current conversion, power loss during turn-on may be reduced. For example, when the first AC power V1 supplied by the first external AC power source G1 passes through the first thyristor TH1, efficiency of supply of the first AC power V1 to the load 200 may range from about 98% to about 99%.

A facility including the load 200 with power requirements such as, for example, a semiconductor manufacturing facility, may require a large amount of power. A general uninterruptible power supply that continuously supplies power through a converter and inverter causes significant power loss, but the hybrid uninterruptible power supply 100 according to some embodiments may supply power through the first thyristor TH1 included in the current thrupass unit THP, and thus, power may be supplied to the load 200 with higher efficiency than the general uninterruptible power supply.

The general uninterruptible power supply continuously uses a converter and inverter due to power supply through the converter and inverter, and accordingly, there is a relatively high possibility of failure due to aging, but the hybrid uninterruptible power supply 100 according to some embodiments does not require continuous use of the converter 110 and inverter 120, the lifespan of the hybrid uninterruptible power supply 100 may be increased.

The inverter 120 may adjust the phase of a current. By greatly reducing the reactive power generated due to a phase difference between an AC voltage and an AC current, the inverter 120 may compensate for the reactive power.

Active power refers to the power that is actually used by a load to perform work, and refers to the power used to perform the intended work. The reactive power refers to the power required to supply power to the load but not used to perform actual work. The reactive power may mainly be generated by an inductive load and may be generated by a phase difference between an AC voltage and an AC current. The reactive power may continuously cause unnecessary power movement and reduce the efficiency of a power system.

During a normal operation, the hybrid uninterruptible power supply 100 according to some embodiments may supply power to the load 200 through the current thrupass unit THP as described above. In this case, the second switch SW2 provided on a line connecting the inverter 120 to the load 200 may be closed such that power is also provided to the inverter 120. When the same power is provided to the inverter 120 and the load 200 through the second switch SW2, the inverter 120 may compensate for harmonics and reduce reactive power.

When a facility corresponding to the load 200 non-linearly consumes power, a non-linear load occurs, and the non-linear load may be a major cause of generating harmonics in a power system. The harmonics refer to distortions of a voltage and current which occur in the power system.

The inverter 120 may function as an active filter. The inverter 120 may generate an opposite compensation current that cancels a harmonic current. The inverter 120 is an active filter and may generate a compensation current required to neutralize harmonics and output a current having a phase exactly opposite to a phase of the harmonics. That is, the inverter 120 may remove harmonics.

In the hybrid uninterruptible power supply 100 according to some embodiments, power may be supplied from the first external AC power source G1 to the load 200 through the inverter 120, and thus, harmonics generated due to the non-linear power load of the load 200 may be compensated. Therefore, the hybrid uninterruptible power supply 100 may supply power with higher quality to the load 200.

Figure 3:
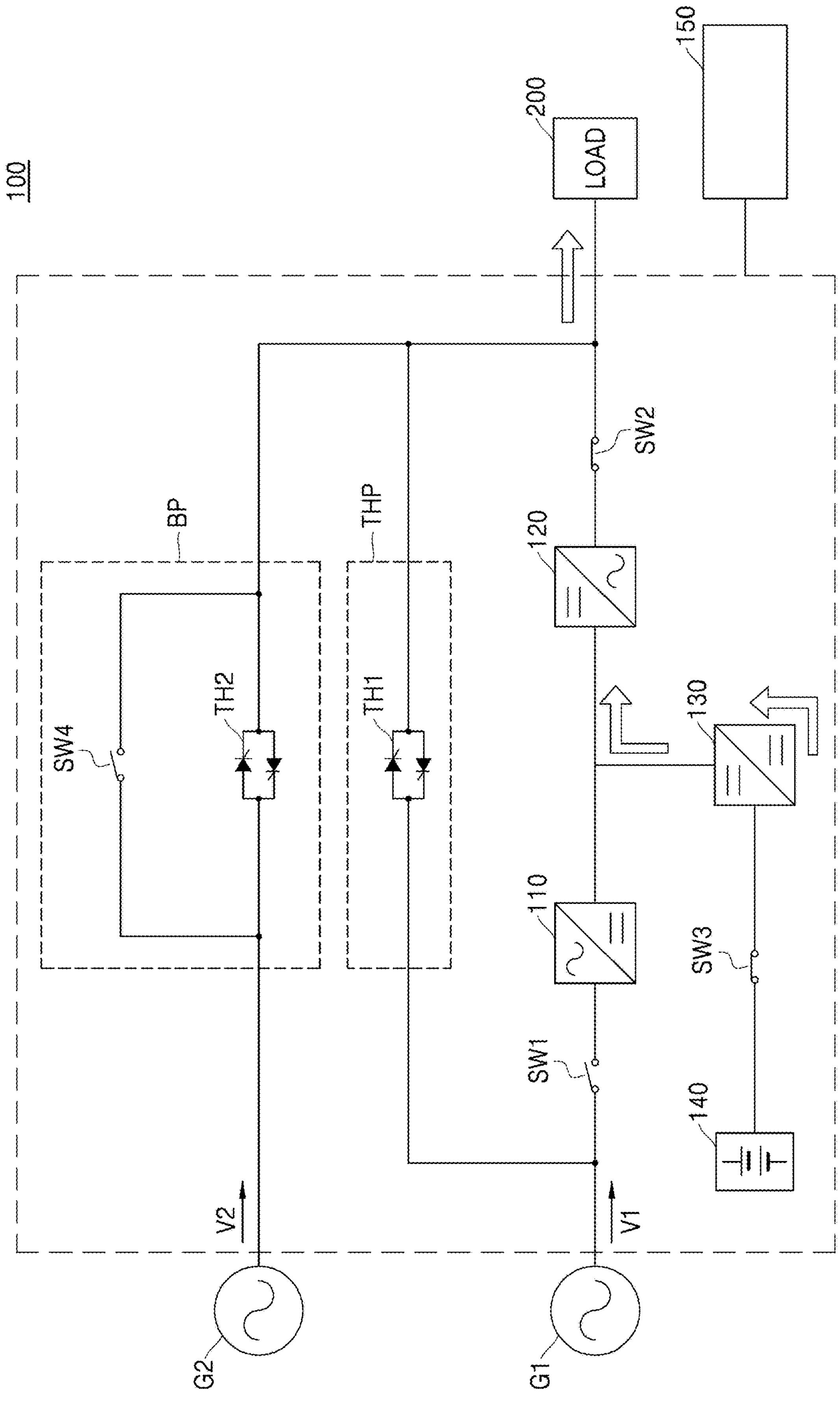
FIG. 3 is a circuit diagram illustrating an operation of a hybrid uninterruptible power supply according to some embodiments.

As illustrated in FIG. 3, the hybrid uninterruptible power supply 100 according to some embodiments may also supply power from the battery 140 to the load 200, like the general uninterruptible power supply. For example, when a voltage drop of the first external AC power source G1 is detected, a power storage unit including the battery 140 and the DC converter 130 may supply power. In this case, the battery 140 may be discharged, the DC converter 130 may convert an AC voltage into a DC voltage suitable to be supplied to the inverter 120 and supplies it to the inverter 120, and the inverter 120 may convert the received DC current into an AC current to be supplied to the load 200.

That is, the hybrid uninterruptible power supply 100 according to some embodiments may compensate for a voltage even when there is a voltage drop in the external AC power source. Similarly, even when the power supply of the external AC power source is interrupted as well as the voltage drop of the external AC power source, power may be supplied to the load 200 from the battery 140.

Figure 4:
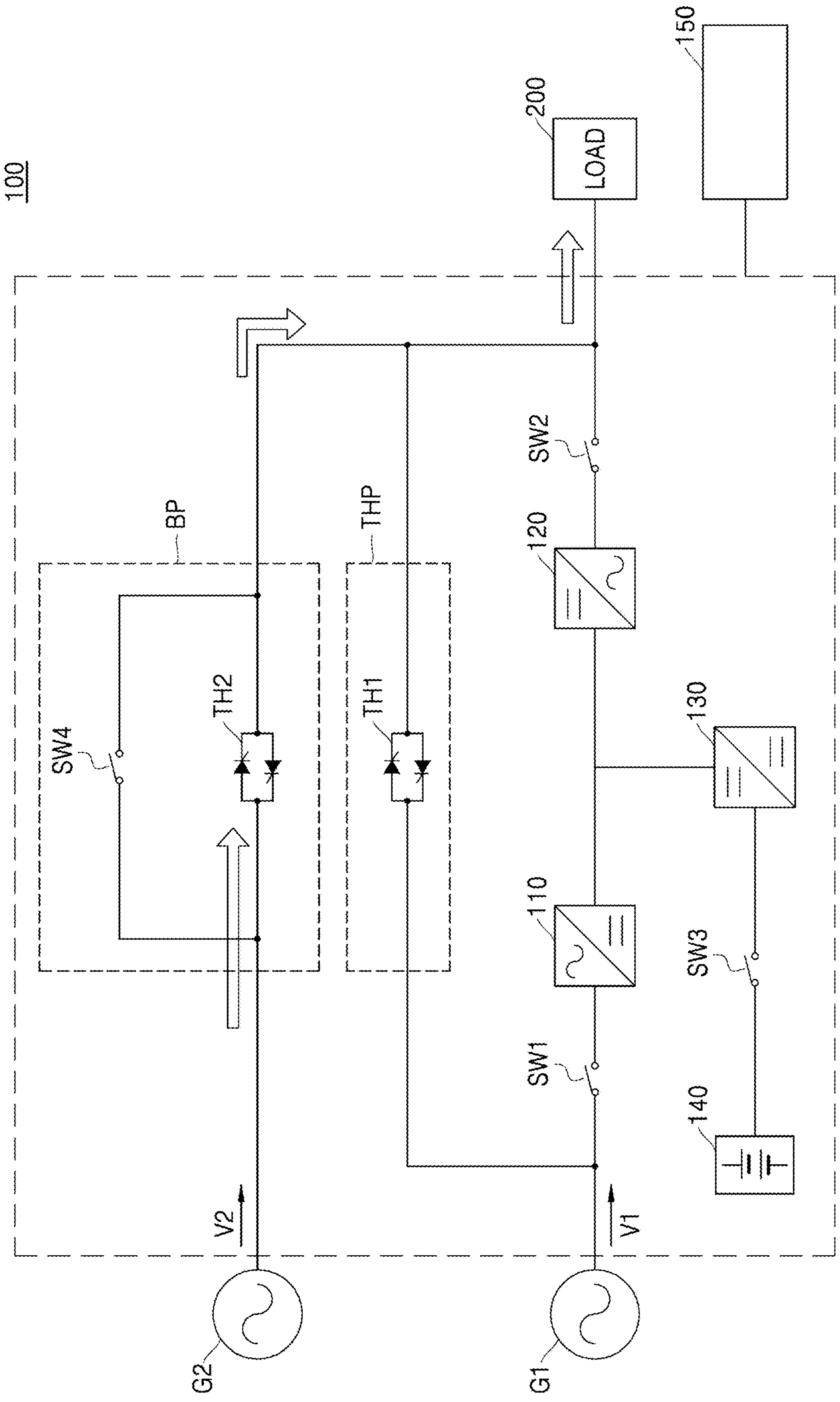
FIG. 4 is a circuit diagram illustrating an operation of a hybrid uninterruptible power supply according to some embodiments.
Figure 5:
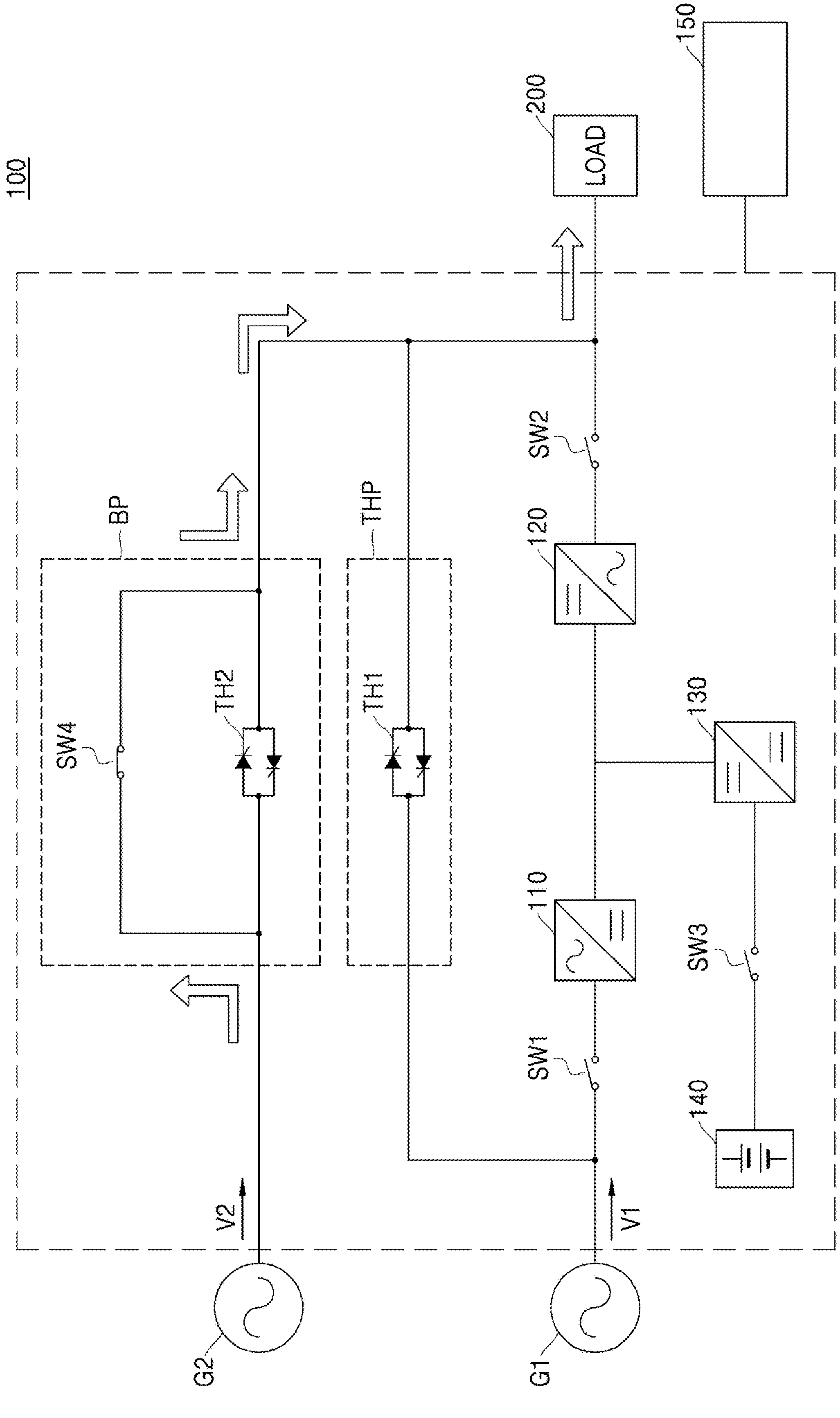
FIG. 5 is a circuit diagram illustrating an operation of a hybrid uninterruptible power supply according to some embodiments.

As illustrated in FIG. 4, when the power conversion unit including the converter 110, the inverter 120, and the DC converter 130 fails, or when the power supply from the first external AC power source G1 is interrupted, a second external AC power source G2 may supply second AC power V2 to the load 200. The second AC power V2 supplied by the second external AC power source G2 may be first supplied to the load 200 through the second thyristor TH2.

A large-scale facility may include dual power supplies to ensure stable power supply. That is, the first external AC power source G1 and the second external AC power source G2 may be separate power sources that are not interconnected to each other. For example, even when the first external AC power source G1 is turned off, the second external AC power source G2 may not be turned off. In contrast to this, even when the second external AC power source G2 is turned off, the first external AC power source G1 may not be turned off. For example, even when power is not supplied by the first external AC power source G1 because an operation element of a power system facility, such as an external transformer, for supplying the first external AC power source G1 is not smooth, the second external AC power source G2 may supply power.

The first AC power V1 supplied by the first external AC power source G1 which is a main power source is supplied through the first thyristor TH1, and for example, when an abnormality occurs in power supply through the first external AC power source G1, the second thyristor TH2 may be immediately activated to supply power to the load 200 by the second external AC power source G2 which is an auxiliary power source.

For example, when the power supply from the first external AC power source G1 is interrupted, the controller 150 may detect the interruption of the first AC power V1 supplied by the first external AC power source G1. The interruption of the supply of the first AC power V1 may be detected by, for example, a measurement device on a line connecting the first external AC power G1 to the hybrid uninterruptible power supply 100.

When the first external AC power source G1 is interrupted, the hybrid uninterruptible power supply 100 may first supply power to the load 200 from the battery 140 through the DC converter 130 with switch SW3 and switch SW2 both closed, and accordingly, even when power supply from the first external AC power source G1 is interrupted, power may be continuously supplied to the load 200.

When the power supply from the first external AC power source G1 is interrupted and power is supplied from the battery 140 to the load 200 through the DC converter 130, the second thyristor TH2 may be immediately activated, and the second external power source G2 which is an auxiliary power source may supply power to the load 200. Immediately after the second thyristor TH2 is activated and the second external AC power source G2 begins to supply power to the load 200, the fourth switch SW4 may be closed. Closing of the fourth switch SW4 is described in detail below.

The second thyristor TH2 may be configured by an SCR like the first thyristor TH1. Because the second thyristor TH2 may be activated in response to a gate pulse signal, activation time may be reduced.

Because the hybrid uninterruptible power supply 100 according to some embodiments includes the power storage unit, the second thyristor TH2 may be activated to stabilize the power supply to the load 200 through discharge of the battery 140. Accordingly, by stably supplying power to a facility corresponding to the load 200, reliability of the power supplied to the facility corresponding to the load 200 may be increased.

Because the power supplied by the first external AC power source G1 continuously passes through the first thyristor TH1, the first thyristor TH1 has to be designed to have a capacity for sufficiently supplying the power consumed by the load 200. However, the second thyristor TH2 is configured to supply power from the second external AC power source G2 to the load 200 until the fourth switch SW4 is closed, and accordingly, the second thyristor TH2 may be configured to have a relatively small capacity compared to the first thyristor TH1.

Immediately after the second thyristor TH2 is activated and the second external AC power source G2 supplies power to the load 200 through the second thyristor TH2, the fourth switch SW4 may be closed. This is because the time at which the second thyristor TH2 is activated and power is supplied through the second thyristor TH2 is faster than the time at which the fourth switch SW4 is closed and power is supplied through the fourth switch SW4. For example, opening and closing of the fourth switch SW4 may be controlled by the controller 150. Also, the fourth switch SW4 may simultaneously receive a gate pulse signal for activating the second thyristor TH2 to be closed. The power capacity of the second thyristor TH2 may be less than the power capacity of the first thyristor TH1, and power may be supplied to the load 200 through the second thyristor TH2 until the fourth switch SW4 is closed.

The hybrid uninterruptible power supply 100 according to some embodiments may supply power to the load 200 through the current thrupass unit THP including the first thyristor TH1, rather than supplying main power through the converter 110 and the inverter 120 of the general uninterruptible power supply, and thus, power may be supplied with high efficiency, and expected lifespan may be increased by using the power conversion unit including the converter 110 and the inverter 120.

Also, when the first external AC power source G1 does not smoothly supply the first AC power V1 because an abnormality occurs in the first external AC power source G1 which is the main power source, the second thyristor TH2 may be activated to immediately supply power to the load 200 from the second external AC power source G2. However, because the second external AC power source G2 may supply power to the load 200 through discharging of the battery 140 such that the power is stably supplied to the load 200, power may be stably supplied to a facility corresponding to the load 200. Therefore, the reliability and efficiency of power supply to a facility corresponding to the load 200 by the hybrid uninterruptible power supply 100 according to some embodiments may be increased.

Figure 6:
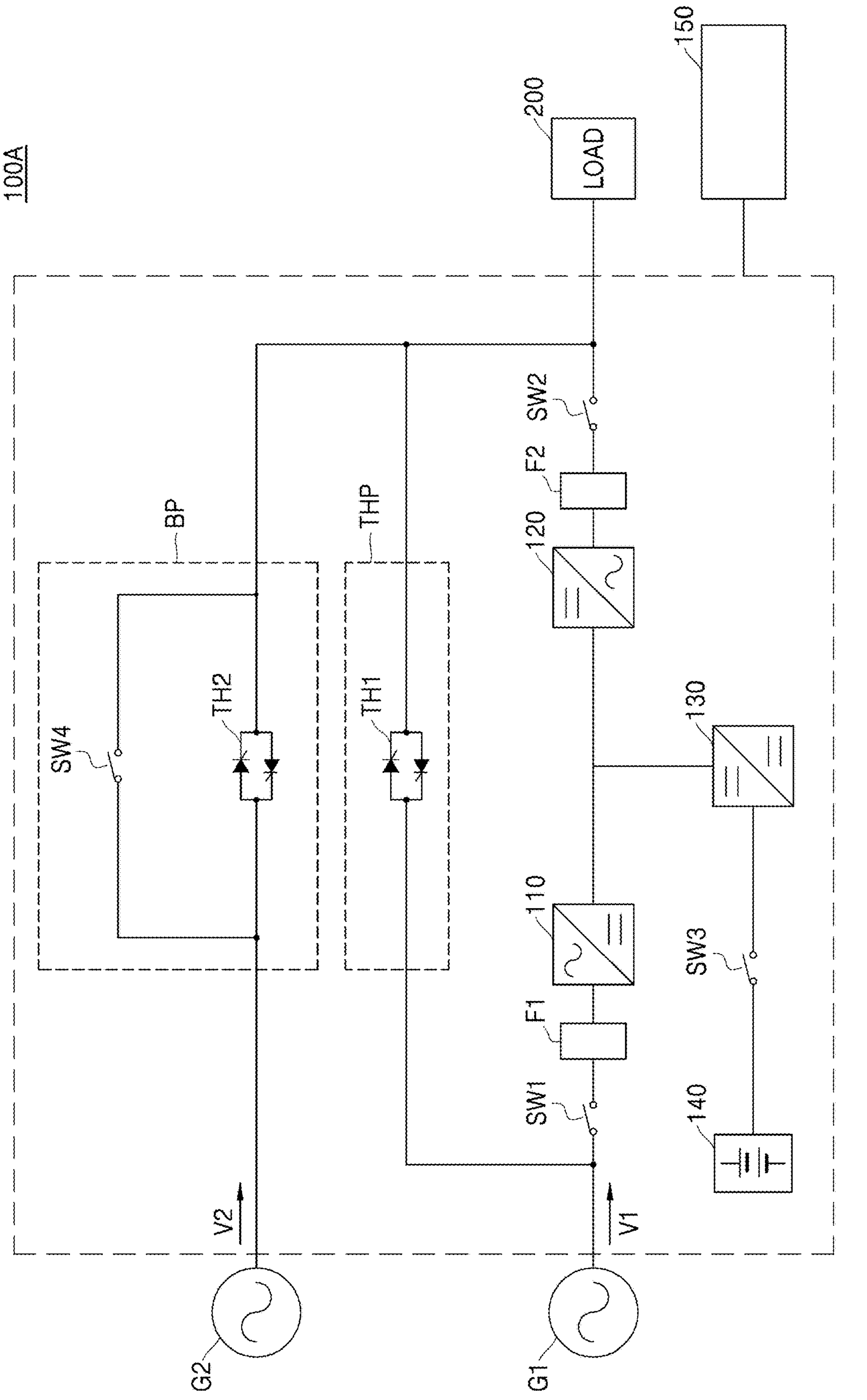
FIG. 6 is a circuit diagram illustrating a hybrid uninterruptible power supply according to some embodiments.

FIG. 6 is a circuit diagram illustrating a hybrid uninterruptible power supply 100A according to some embodiments. Redundant descriptions of the hybrid uninterruptible power supply 100A may be omitted below.

Referring to FIG. 6, the hybrid uninterruptible power supply 100A may include a power conversion unit including a converter 110, an inverter 120, a DC converter 130, and a battery 140, and a first thyristor, a current thrupass unit THP including a first thyristor TH1, a current bypass unit BP including a second thyristor TH2 and a fourth switch SW4, a controller 150, a first filter F1, and a second filter F2. The power conversion unit may further include a first switch SW1, a second switch SW2, and a third switch SW3.

The first switch SW1 may be placed before the converter 110, the second switch SW2 may be placed behind the inverter 120 (i.e., between filter F2 and load 200), and the third switch SW3 may be placed between the battery 140 and the DC converter 130. In addition to the first, second, and third switches SW1, SW2, and SW3, other switches may be further included in the hybrid uninterruptible power supply 100A as needed.

The first filter F1 may be provided on a line connecting the first switch SW1 to the converter 110, and the second filter F2 may be provided on a line connecting the inverter 120 to the second switch SW2. The first filter F1 and the second filter F2 may each include at least one of a low-pass filter, an electromagnetic interference/radio frequency interference (EMI/RFI) filter, a surge protector, and a harmonic filter.

Unlike FIG. 6, the first filter F1 may be placed on a line before a point where a line connected to the first external AC power source G1 is branched to the first thyristor TH1 and the converter 110. Also, the first filter F1 may be placed in front of the first thyristor TH1, between the first thyristor TH1 and the first external AC power source G1, or between the second thyristor TH2 and the second external AC power source G2. The second filter F2 may be placed on a line which faces the load 200 and to which the inverter 120, the first thyristor TH1, and the second thyristor TH2 are connected.

In the hybrid uninterruptible power supply 100A according to some embodiments, during a normal operation and during an operation through the current bypass unit BP, power supply through the converter 110 and the inverter 120 is not a main power supply path. That is, the power supplied by the first external AC power source G1 and the second external AC power source G2 may be supplied to the load 200 as it is. Because there is possibility that power with a waveform and characteristics required for the load 200 may not be stably supplied from the first external AC power source G1 and the second external AC power source G2, by providing the first filter F1 and the second filter F2, the power supplied to the load 200 may be filtered.

Figure 7:
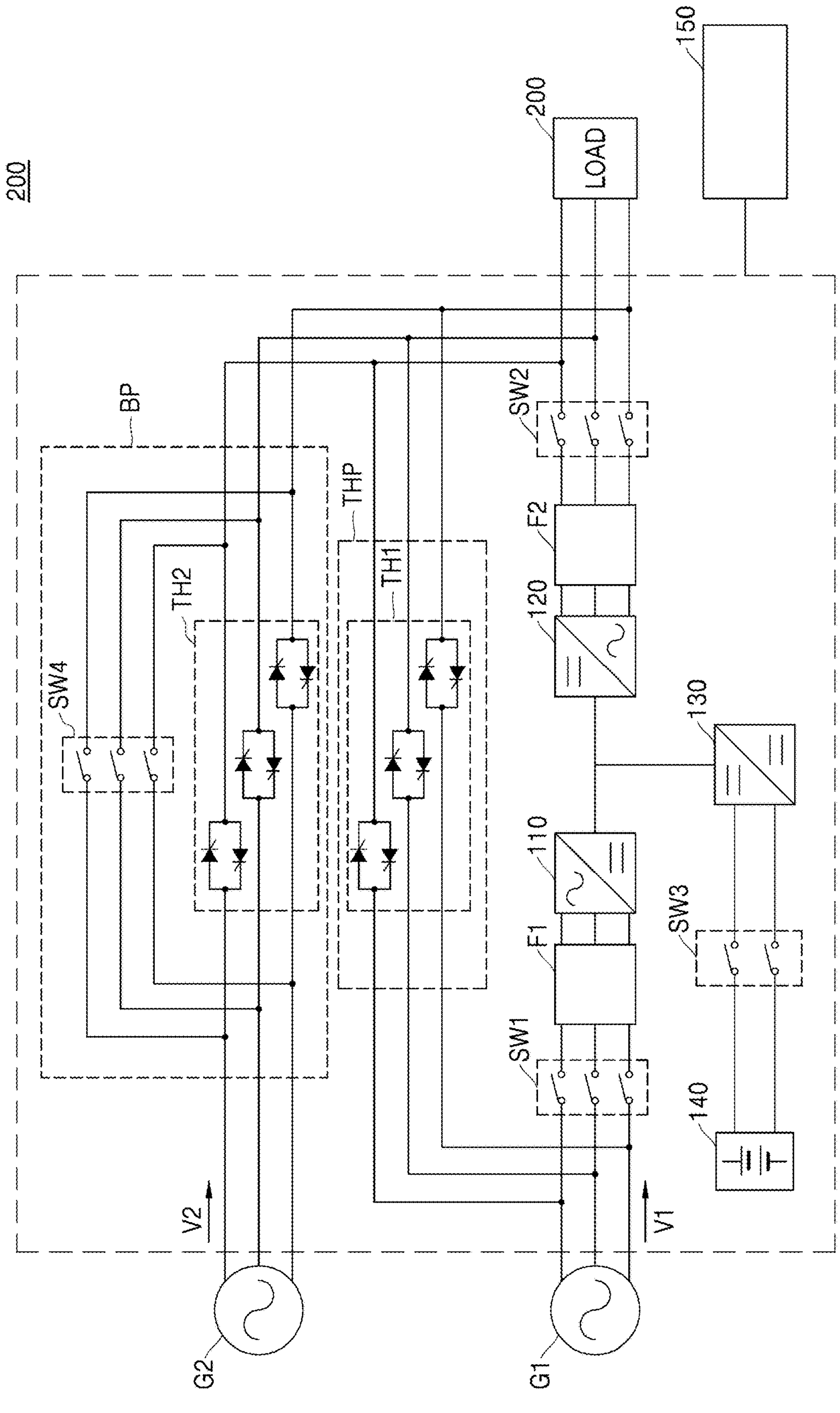
FIG. 7 is a circuit diagram illustrating a hybrid uninterruptible power supply according to some embodiments.

FIG. 7 is a circuit diagram illustrating a hybrid uninterruptible power supply 100B according to some embodiments. Redundant descriptions of the hybrid uninterruptible power supply 100B may be omitted below.

Referring to FIG. 7, the hybrid uninterruptible power supply 100B illustrated in FIG. 7 may include a first external AC power source G1 and a second external AC power source G2 each of which is a three-phase AC power source, unlike the hybrid uninterruptible power supply 100 illustrated in FIG. 1 and the hybrid uninterruptible power supply 100A illustrated in FIG. 6.

The three-phase AC power source is a power system outputting separate three AC currents, and the three AC currents may have the same frequency and different phases between which there is a phase difference of 120 degrees. In general, the three-phase AC power source is easily used in a larger facility, may supply power to the facility more efficiently due to a higher voltage compared to a single-phase AC power, and may supply a constant average power to a load. In general, three phases may be denoted by R, S, and T, and a neutral phase N may also be provided, but a circuit for the neutral phase is omitted in FIG. 7.

The hybrid uninterruptible power supply 100B may include a power conversion unit including a converter 110, an inverter 120, a DC converter 130, and a battery 140, a current thrupass unit including a first thyristor TH1, a current bypass unit BP including a second thyristor TH2 and a fourth switch SW4, a controller 150, a first filter F1, and a second filter F2.

The first external AC power source G1 and the second external AC power source G2 may each supply three-phase AC power, and three first thyristors TH1 may be provided for respective phases. That is, the current thrupass unit THP may include the three first thyristors TH1 to respectively correspond to three phases of AC currents.

Also, the current bypass unit BP including the second thyristor TH2 and the fourth switch (SW4) may be provided for respective phases of the three-phase AC power sources. That is, three second thyristors TH2 and three fourth switches SW4 may be provided in the current bypass unit BP to correspond to respective phases of an AC current.

The entire configuration of the hybrid uninterruptible power supply 100B, except the three configurations provided to correspond to three-phase AC power, is generally similar to the hybrid uninterruptible power supply 100 of FIG. 1 and the hybrid uninterruptible power supply 100A of FIG. 6.

As described above, embodiments of the inventive concept are described with reference to the attached drawings, and those of skill in the art to which the inventive concept belongs will understand that the inventive concept may be modified into other specific forms without changing the technical idea or essential features. Therefore, the embodiments described above are illustrative in all respects and should not be understood as limiting.

While the inventive concept has been particularly shown and described with reference to embodiments thereof, it will be understood that various changes in form and details may be made therein without departing from the spirit and scope of the following claims.

What is claimed is:

1. A hybrid uninterruptible power supply comprising:

a power conversion unit including a converter electrically connected to a first external alternating current (AC) power source, an inverter electrically connected to an output of the converter and to a load, and a power storage unit electrically connected between the converter and the inverter;

a current thrupass unit electrically connected to the first external AC power source and electrically connected to the load, wherein the current thrupass unit comprises a first thyristor;

a current bypass unit including a second thyristor and a switch electrically connected in parallel to the second thyristor, wherein the second thyristor is electrically connected to a second external AC power source and electrically connected to the load; and a controller configured to control the power conversion unit, the current thrupass unit, and the current bypass unit, wherein during a normal operation, power from the first external AC power source is supplied to the load through the current thrupass unit rather than through the converter and the inverter.

2. The hybrid uninterruptible power supply of claim 1, wherein the first external AC power source and the second external AC power source are separate power sources.

3. The hybrid uninterruptible power supply of claim 1, wherein the controller is further configured to, during a normal operation, control power supplied by the first external AC power source to the load through the current thrupass unit.

4. The hybrid uninterruptible power supply of claim 3, wherein the controller is further configured to, during the normal operation, selectively charge the power storage unit by the converter.

5. The hybrid uninterruptible power supply of claim 3, wherein the inverter is configured to, during the normal operation, operate as an active power filter for the load.

6. The hybrid uninterruptible power supply of claim 3, wherein the controller is further configured to enable the power storage unit to supply power to the load when detecting an abnormality of the first external AC power source during the normal operation, and wherein the abnormality of the first external AC power source includes one of a voltage drop of the first external AC power source or interruption of receiving power from the first external AC power source.

7. The hybrid uninterruptible power supply of claim 3, wherein the inverter is configured to compensate for reactive power for the load during the normal operation.

8. The hybrid uninterruptible power supply of claim 3, wherein the controller is further configured to detect interruption of the first external AC power source, wherein when the first external AC power source is interrupted, the power storage unit is configured to supply power to the load, and wherein the controller is further configured to control supplying power by the second external AC power source to the load through the second thyristor.

9. The hybrid uninterruptible power supply of claim 8, wherein the controller is further configured to, when the power is supplied from the second external AC power source to the load through the second thyristor, close the switch of the current bypass unit such that the power supplied by the second external AC power source is supplied to the load through the switch when the switch is closed.

10. The hybrid uninterruptible power supply of claim 1, wherein a first filter is provided on an electrical line between the first external AC power source to the converter, and wherein a second filter is provided on an electrical line connecting the inverter to the load.

11. The hybrid uninterruptible power supply of claim 10, wherein each the first filter and the second filter includes at least one of a low-pass filter, an electromagnetic interference/radio frequency interference (EMI/RFI) filter, or a harmonic filter.

12. The hybrid uninterruptible power supply of claim 1, wherein the first external AC power source comprises a first three-phase AC power supply and the second external AC power source comprises a second a three-phase AC power supply, wherein the hybrid uninterruptible power supply includes three current thrupass units and three current bypass units, wherein the three current thrupass units are electrically connected to the first three-phase AC power supply to respectively correspond to phases of the first three-phase AC power supply, and wherein the three current bypass units are electrically connected to the second three-phase AC power supply to respectively correspond to phases of the second three-phase AC power supply.

13. The hybrid uninterruptible power supply of claim 1, wherein each of the first thyristor and the second thyristor includes a silicon controlled rectifier (SCR).

14. The hybrid uninterruptible power supply of claim 1, wherein the power storage unit comprises a battery and a direct current converter electrically connected between the battery, the converter, and the inverter.

15. A hybrid uninterruptible power supply comprising:

a power conversion unit comprising a converter electrically connected to a first external AC power source, an inverter electrically connected to an output of the converter and to a load, and a power storage unit electrically connected between the converter and the inverter;

a high-efficiency operation unit electrically connected to the first external AC power source and electrically connected to the load, wherein the high-efficiency operation unit comprises a first thyristor;

a current bypass unit comprising a second thyristor electrically connected to a second external AC power source and electrically connected to the load, and a bypass switch electrically connected in parallel to the second thyristor; and a controller configured to control the power conversion unit, the high-efficiency operation unit, and the current bypass unit, wherein the first external AC power source and the second external AC power source are separate power sources, wherein the controller is further configured to, during a normal operation, control power supplied by the first external AC power source to the load through the high-efficiency operation unit rather than through the converter and the inverter, wherein the controller is further configured to selectively charge the power storage unit by the converter during normal operation, wherein the controller is further configured to detect interruption of the first external AC power source, wherein the power storage unit is configured to supply power to the load when the first external AC power source is interrupted, and wherein the controller is configured to activate the second thyristor by transmitting an electrical signal to the second thyristor to supply power to the load from the second external AC power source through the second thyristor.

16. The hybrid uninterruptible power supply of claim 15, wherein the controller is further configured to, during the normal operation, supply power to the load through the power storage unit when detecting an abnormality of the first external AC power source, and wherein the abnormality of the first external AC power source includes one of a voltage drop of the first external AC power source or interruption of receiving power from the first external AC power source.

17. The hybrid uninterruptible power supply of claim 15, wherein the controller is further configured to, when power is supplied from the second external AC power source to the load through the second thyristor, close the bypass switch of the current bypass unit such that the power supplied by the second external AC power source is supplied to the load through the bypass switch.

18. The hybrid uninterruptible power supply of claim 15, wherein the inverter operates as an active power filter for the load to compensate for reactive power for the load.

19. The hybrid uninterruptible power supply of claim 15, wherein the first external AC power source comprises a first three-phase AC power supply and the second external AC power source comprises a second three-phase AC power supply, wherein the hybrid uninterruptible power supply includes three current thrupass units and three current bypass units, wherein the three current thrupass units are electrically connected to the first three-phase AC power supply to respectively correspond to phases of the first three-phase AC power supply, and wherein the three current bypass units are electrically connected to the second three-phase AC power supply to respectively correspond to phases of the second three-phase AC power supply.

20. A hybrid uninterruptible power supply comprising:

a power conversion unit including a converter electrically connected to a first external AC power source, an inverter electrically connected to an output of the converter and to a load, and a power storage unit electrically connected between the converter and the inverter;

a high-efficiency operation unit electrically connected to the first external AC power source and the load, wherein the high-efficiency operation unit comprises a first thyristor;

a current bypass unit comprising a second thyristor electrically connected to a second external AC power source and the load, and a bypass switch electrically connected in parallel to the second thyristor; and a controller configured to control the power conversion unit, the high-efficiency operation unit, and the current bypass unit, wherein the first external AC power source and the second external AC power source are separate power sources, wherein the controller is further configured to, during normal operation, control power supplied by the first external AC power source to the load through the high-efficiency operation unit rather than through the converter and the inverter, wherein the controller is further configured to, during the normal operation, selectively charge the power storage unit by the converter, wherein the controller is further configured to detect interruption of the first external AC power source, wherein the controller is further configured to supply power to, during the normal operation, the load from the power storage unit when detecting an abnormality of the first external AC power source, wherein the abnormality of the first external AC power source includes one of a voltage drop of the first external AC power source or interruption of receiving power from the first external AC power source, wherein the power storage unit is configured to supply power to the load when the first external AC power source is interrupted, and the controller is configured to activate the second thyristor by transmitting an electrical signal to the second thyristor to supply power to the load from the second external AC power source through the second thyristor, wherein the controller is further configured to, when power is supplied from the second external AC power source to the load through the second thyristor, close the bypass switch of the current bypass unit such that the power supplied by the second external AC power source is supplied to the load through the bypass switch, wherein the inverter operates as an active power filter for the load to compensate for reactive power for the load, wherein the first external AC power source comprises a first three-phase AC power supply and the second external AC power source comprises a second three-phase AC power supply, wherein the hybrid uninterruptible power supply includes three current thrupass units and three current bypass units, the three current thrupass units are electrically connected to the first three-phase AC power supply to respectively correspond to phases of the first three-phase AC power supply, and the three current bypass units are electrically connected to the second three-phase AC power supply to respectively correspond to phases of the second three-phase AC power supply, and wherein each of the first thyristor and the second thyristor includes a silicon controlled rectifier (SCR).

* * * * *